Sept. 2, 1930.  A. RUSH  1,774,672
BUMPER FOR MOTOR VEHICLES
Filed May 1, 1929
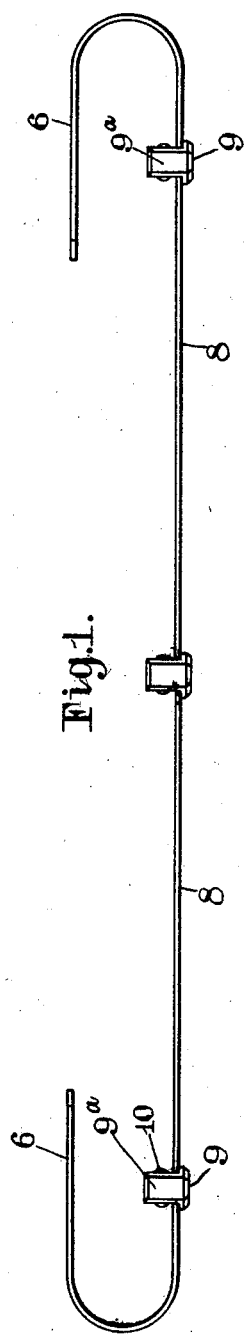
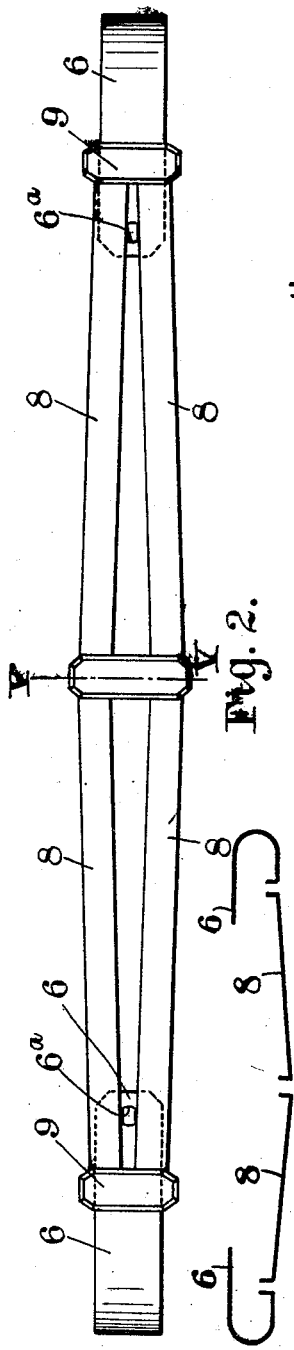
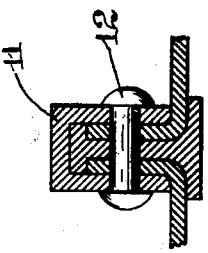
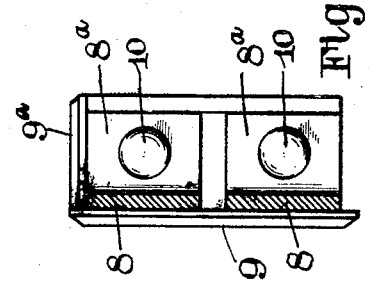
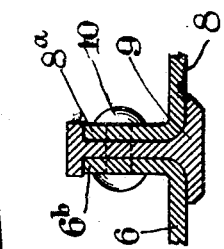
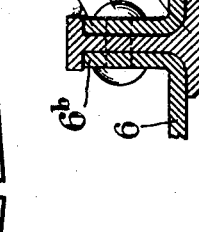
Inventor
ALBERT RUSH
his Attorneys Patented Sept. 2, 1930

1,774,672

UNITED STATES PATENT OFFICE

ALBERT RUSH, OF COLUMBUS, OHIO

BUMPER FOR MOTOR VEHICLES

Application filed May 1, 1929. Serial No. 359,618.

This invention relates to bumpers and more particularly to bumpers for motor vehicles.

In bumpers that include continuous pieces much loss is occasioned by defects discovered in the pieces after considerable progress has been made in the fabrication, hence an object of the invention is to provide a bumper made up of several pieces so that a defect discovered in one results in smaller loss. Moreover small pieces can be handled with greater facility. Another object of the invention is to lessen the cost of manufacture by the employment, if desired, of structural steel in the main impact portion of the bumper so that no tempering is required and the parts can be more easily bent at their ends for making the joints. Other objects and advantages will appear from the disclosure herein.

The invention is embodied in the example herein shown and described the features of novelty being finally claimed.

In the accompanying drawing—

Figure 1 is a top plan view of the bumper according to my invention.

Fig. 2 is a front view.

Fig. 3 is a view of one form of joint for the members.

Fig. 4 is a modified form of joint.

Fig. 5 is a section on the line V—V Fig. 2 looking to the left.

Fig. 6 is a diagrammatic view illustrating how the impact bar can be given a camber.

In the views 6 designates the brackets which are of spring or tempered steel. Said brackets are each provided at their inner ends with a hole 6ª by means of which the bracket can be bolted to the automobile at the usual place. The outer end of each bracket is bent inward as illustrated at 6ᵇ for the purpose to be presently explained.

The principal impact members are designated 8, these being, in the instance shown, four distinct strips of structural steel each bent at both ends as illustrated at 8ª and similarly to the bends 6ᵇ of the bracket members. Structural steel is relatively non-resilient as compared with spring steel and the term is used in this sense.

The bent ends 6ᵇ and 8ª are fitted in the opposite recessed sides of an escutcheon or tie member 9 and riveted thereto by rivets 10.

For ornamental or other effects the top of the escutcheon or tie member can be extended to form a cover 9ª for the joint at the top. The front and top of the escutcheon thus conceals the joint from ordinary view when the bumper is mounted; and said escutcheon can be of a more or less ornamental character according to the taste of the builder or user.

The principal impact member can be given a camber by making the parts of the impact bar longer for the span between the ends of the brackets and by suitably changing the angles of the bends as suggested in Fig. 6 to fit the recesses in the sides of the escutcheon but this is a matter of taste and mechanics.

In Fig. 4 an angular cap 11 is shown as added to the rear of the assembled bent ends and escutcheon in which case the securing rivets, as at 12, are passed through the cap as well as the bent ends and escutcheon. It will be observed that in either construction no bolts or rivets appear on the face of the bumper.

By employing structural steel for the impact portion or intermediate sections the strips can be bent cold and the expense of removing the scale preparatory to nickel plating avoided. In many cases a damaged bumper of the kind described can be repaired by replacing the part or parts damaged and thus save to the user the cost of an entire bumper.

The forms and number of the parts can be changed without departing from the gist of the invention as claimed.

What I claim is:

1. A vehicle bumper including a pair of curved spring steel brackets each for connection at one end to the vehicle, and an impact member connected with and extending between the other ends of said brackets, said impact member including a bar composed of a plurality of distinct substantially straight strips of metal bent rearwardly at their ends, and an escutcheon with securing means uniting said bent ends, said bar being the sole means connecting the free ends of said brackets.

2. A vehicle bumper including a pair of curved spring steel brackets each connected at one end to the vehicle, and an impact member connected with the other ends of said brackets, said impact member including a bar composed of a plurality of distinct and relatively non-resilient bars bent rearwardly at their ends, and an escutcheon with securing means uniting said bent ends, said bar being the sole means connecting the free ends of said brackets.

3. A vehicle bumper including a pair of curved spring steel brackets each for connection at one end to the vehicle, and an impact member connected with and extending between the other ends of said brackets, said impact member including a bar composed of a plurality of distinct substantially straight strips of metal bent rearwardly at their ends, an escutcheon and a rear cover for the bent ends with securing means uniting said bent ends, said bar being the sole means connecting the free ends of said brackets.

4. A vehicle bumper including a pair of curved spring steel brackets each connected at one end to the vehicle, and an impact member connected with the other ends of said brackets, said impact member including a bar composed of a plurality of distinct and relatively non-resilient bars bent rearwardly at their ends, an escutcheon, and a rear cover for the bent ends with securing means uniting said bent ends, said bar being the sole means connecting the free ends of said brackets.

5. A vehicle bumper including a pair of curved spring steel brackets, each adapted at one end for attachment to the vehicle and having its other end inwardly bent, and an impact member connected with and extending between the bent ends of said brackets, said impact member including a bar composed of a plurality of distinct substantially straight strips of metal bent rearwardly at their ends, and escutcheons with securing means uniting said bent ends of the bar and also uniting the bent ends of the brackets and bars.

ALBERT RUSH.